AUDIO COMPRESSOR CIRCUIT

Filed Aug. 27, 1964

2 Sheets-Sheet 1

INVENTOR.
GERALD R. PAUL
BY Samuel R. Genca
AGENT

INVENTOR.
GERALD R. PAUL

United States Patent Office 3,343,099
Patented Sept. 19, 1967

3,343,099

AUDIO COMPRESSOR CIRCUIT

Gerald R. Paul, Webster, N.Y., assignor to General Dynamics Corporation, a corporation of Delaware Filed Aug. 27, 1964, Ser. No. 392,410
9 Claims. (Cl. 330—192)

ABSTRACT OF THE DISCLOSURE

An audio compressor circuit is described for deriving a substantially constant level output signal voltage in response to an input signal voltage which varies between different signal levels. The circuit includes a voltage divider having a resistor and a unilateral conducting device such as a diode which has an adjustable dynamic resistance responsive to a forward biasing voltage which is derived from the input signal through a DC control amplifier. The output signal or the signal voltage at the junction of the resistor and unilateral conducting device is applied to a utilization circuit through a DC blocking capacitor.

The present invention relates to an audio system, and particularly to an audio compressor circuit for audio systems.

Although the present invention is suited for more general applications, such as telephone, page, and industrial sound systems, it is particularly adapted for use in public address systems. In such systems it is highly desirable to suppress background noise and to produce a substantially constant level of output signal regardless of the amplitude, distance, or direction of the sound source.

In prior art public address systems, it is a problem to produce a substantial constant level of output audio signal from the system when the speaker moves relative to the microphone. This problem is particularly acute when the speaker moves about and directs his voice away from the microphone so as to produce a varying microphone output signal level. Compressor circuits have been used to compensate for varying microphone output signal level. However, the compressor circuits often introduce signal distortion, particularly as the level of compression increases.

It is therefore a general object of the present invention to provide an improved compressor circuit.

It is another object of the present invention to provide an improved compressor circuit which will produce a relatively constant level output signal in response to fluctuating input signals due to variation in direction of sound and distance of a source which produces that sound relative to a microphone or other electrical pickup device.

It is still a further object of the present invention to provide an improved compressor circuit which will reduce sudden peaks of sound at the input of the circuit and suppress ambient background noise during the absence of an input signal thereto.

It is a further object of the present invention to provide an improved audio compressor circuit which operates almost instantaneously.

The foregoing and other objects of the invention are accomplished in a compressor circuit embodying the invention which utilizes the nonlinear dynamic resistance versus current-characteristics of a nonlinear, unilateral conducting device to maintain a relatively constant output voltage over a large change in an input signal voltage. The nonlinear unilateral conducting device is used effectively as a voltage resistance element which is responsive to a direct current control voltage derived from the varying input signal voltage to control its dynamic resistance.

The invention itself, both as to its features and mode of operation, will become more readily apparent from a reading of the following description in connection with the accompanying drawings in which.

Figure 3:
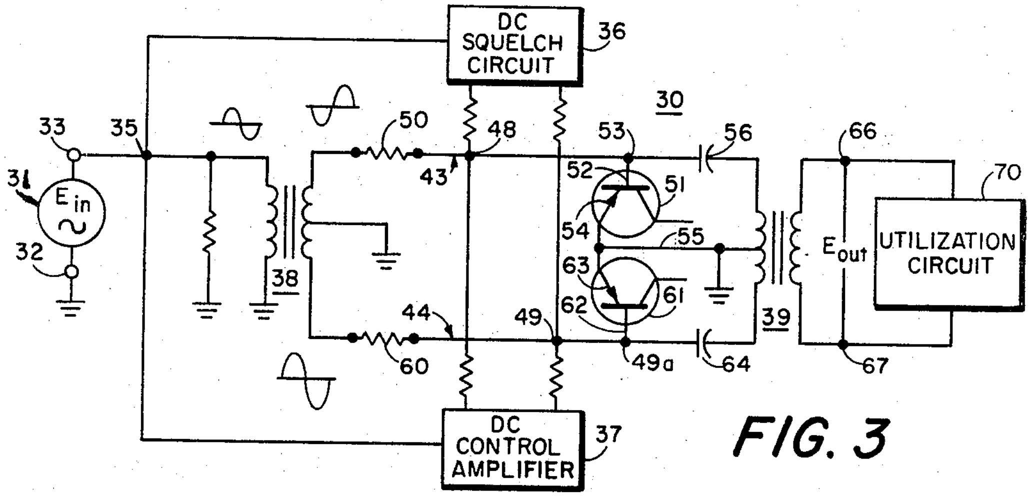
FIG. 3 is a circuit diagram, partially in block form, which shows a compressor having balanced lines in accordance with another embodiment of the invention.
Figure 4:
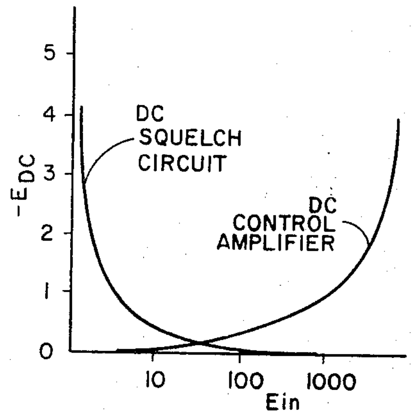
FIG. 4 is a curve chart illustrating the operating characteristics of the DC squelch circuit and the DC control amplifier which is employed in the compression circuit of FIG. 3.
Figure 1:
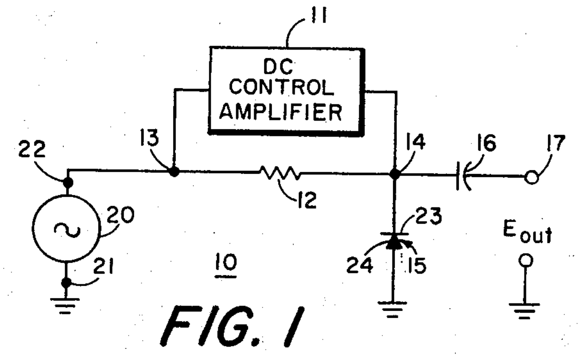
FIG. 1 is a circuit diagram, partially in block form, of an audio compressor embodying the invention.
Figure 4A:
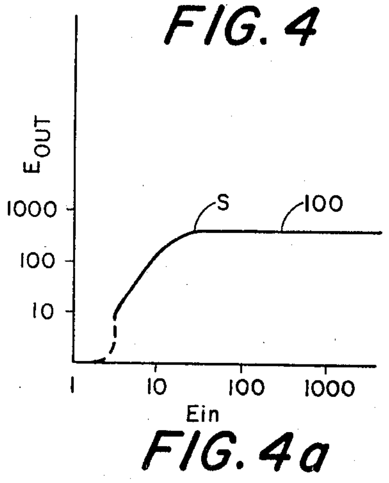
Figure 5:
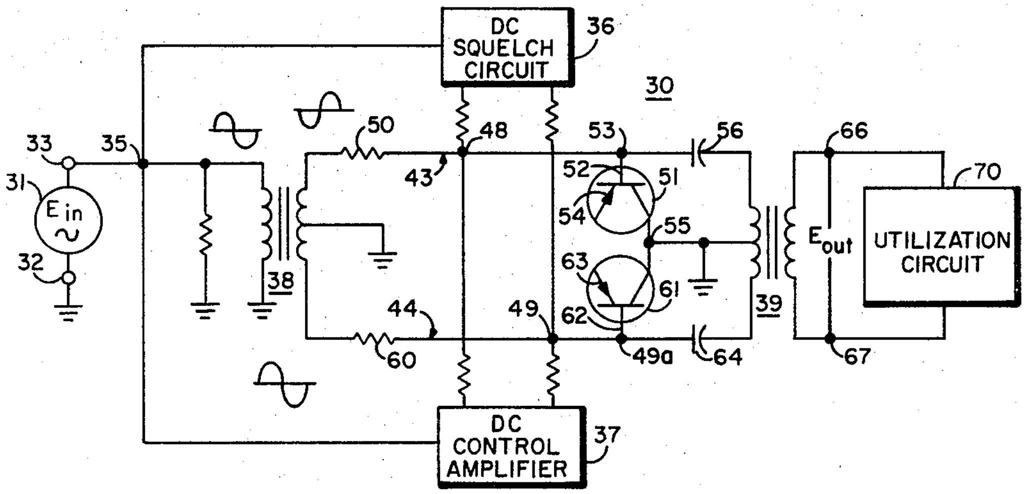

FIG. 4*a* is a curve chart illustrating the operating characteristics of the compressor circuit illustrated in FIG. 3; and FIG. 5 is a circuit diagram similar to FIG. 1 of an audio compressor in accordance with another embodiment of the invention.

Referring particularly to FIG. 1, a compressor circuit 10 includes a DC (direct current) control amplifier 11. A voltage divider network made up of a resistor 12 connected in parallel with the DC control amplifier 11 between junctions 13 and 14 and a nonlinear unilaterally conducting device, such as a diode 15, is connected between junction 14 and ground or other suitable point of reference potential. A blocking capacitor 16 is connected between junction 14 and an output terminal 17 to block any DC voltage appearing at the junction 14.

A source 20 of input signal voltage $E_{in}$ is connected to input terminals 21 and 22 of the compressor circuit 10. The input signal source 20 may be a microphone (not shown) in a public address system. The input signal voltage $E_{in}$ is an alternating current signal voltage. Terminal 21 is connected to ground while terminal 22 is connected directly to junction 13 so that any input signal voltage $E_{in}$ that is applied to the compressor circuit 10 is simultaneously applied to the DC control amplifier 11 and to the voltage divider. The dynamic resistance of the diode 15 therefore is effective in voltage divider operation.

The DC control amplifier 11 may be designed in accordance with techniques known in the art and may include an amplifier circuit, rectifier and filter circuit for deriving a negative direct current voltage $V_{DC-1}$ at junction 14 in response to the application of an alternating current input signal voltage $E_{in}$ at junction 13. The direct current voltage $V_{DC-1}$ and the input signal voltage $E_{in}$ are added algebracially at junction 14 to provide a voltage $V_{be}$ for back biasing or forward biasing the diode into a state of high or low resistance respectively or to vary or adjust its dynamic resistance in accordance with the amplitude of the voltage $V_{be}$.

Figure 2:
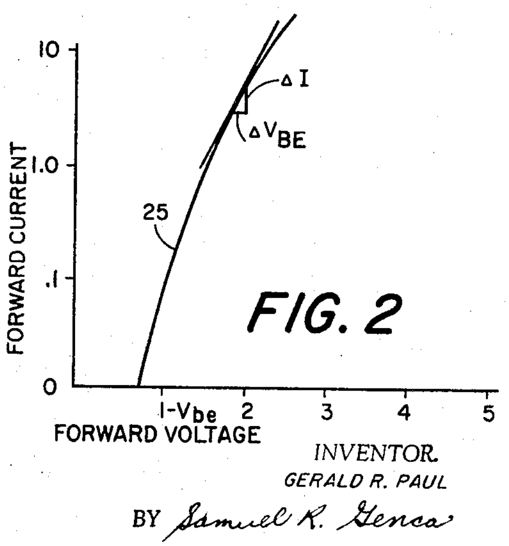
FIG. 2 is the voltage-current characteristic curve of a unilateral conducting device which is used in the compressor circuit of FIG. 3.

FIG. 2 illustrates graphically how the dynamic resistance of the diode may vary with the forward voltage $V_{be}$. The dynamic resistance of the diode is represented by the slope of the line 25 taken at any given point along line 25. In the operation of the compressor circuit 10 of FIG. 1, let is be assumed that a very weak (low level) signal voltage $E_{in}$ is applied to terminals 21 and 22 by the signal source 20. Simultaneously, this voltage is applied to the DC control amplifier 11 and appears across the resistor 12. A negative DC control voltage $V_{DC-1}$ is produced by the amplifier 11 is response to the input signal voltage. This DC control voltage $V_{DC-1}$ is directly proportional to the input signal voltage $E_{in}$ so that the combined signal voltages which appear at junction 14, i.e. are not of a sufficient negative value to forward bias the diode 15. The voltages which are combined produce the forward voltage $V_{be}$. Accordingly, the diode 15 remains in a state of high resistance so that substantially all the input signal voltage $E_{in}$ is applied to the DC blocking capacitor 16 and terminal 17. The DC blocking capacitor 16 blocks the DC current component of the forward voltage $V_{be}$ and passes only the alternating current component of the signal voltage $E_{in}$, less of course that portion of the signal voltage which is attenuated by resistor 12.

Now let it be assumed that a very high input signal voltage $E_{in}$ is applied across the input terminals 21 and 22. Let it also be assumed that the input signal voltage $E_{in}$ is also above a given threshold level. The DC control amplifier 11 produces a high amplitude negative DC control voltage $V_{DC-1}$ which, with the input signal voltage $E_{in}$, provides a high amplitude negative direct current forward voltage $V_{be}$ at junction 14. The diode 15 is now forward biased to a very low dynamic resistance. The diode 15 now provides a shunt to ground through its low dynamic resistance for the alternate current signal components. The DC blocking capacitor 16 blocks the direct current voltage component of the forward voltage $V_{be}$ and passes only the alternating current component of the input signal voltage $E_{in}$. The resistance 12 is of such value as will attenuate the input signal voltage to the desired threshold level. Since the dynamic resistance of the diode 15 is a function of the forward voltage $V_{be}$, the level of output poltage $E_{out}$ can be controlled in varying degrees to produce a substantially constant or equalized level output signal $E_{out}$. The DC control amplifier 11 and the diode 15 control the upper limit of the output signal voltage $E_{out}$ amplitude.

FIG. 3 shows a compressor circuit 30 having balanced lines 43 and 44 and an input at terminals 32 and 33 connected to a source of electrical input signal voltage 31 such as a microphone not shown. Terminal 32 is connected to ground and terminal 33 is connected to a junction 35. Junction 35 is connected to a DC squelch circuit 36, a DC control amplifier 37, and a coupling transformer 38. The squelch circuit 36 is shown in block form and may be any known DC squelch circuit which produces a high negative voltage when a signal below a given level such as background noise or input signal is applied thereto. The circuit 36 produces no output voltage at junctions 48 and 49 when an input signal voltage above the given level appears at junction 35. Thus, squelch circuit 36 acts as a switch which is operative when no signal or a signal below a given level is applied to junction 35 and is not operative and has no output when a signal voltage above the given level is applied to junction 35.

The DC control amplifier 37 is similar to the DC control amplifier 11 of compressor circuit 10 but includes two outputs connected at junctions 48 and 49 so as to supply the balanced lines 43 and 44 with an amplified and a rectified direct current voltage $V_{DC-2}$ in response to an input signal voltage $E_{in}$ applied to junction 35. The direct current voltage $V_{DC-2}$ is directly proportional to the input signal voltage $E_{in}$.

The balanced lines 43 and 44 each include a separate voltage divider network connected between two coupling transformers 38 and 39. The voltage divider network in the balanced line 43 includes a resistor 50 and the base-emitter circuit of a transistor 51. The emitter 54 of this transistor is connected to ground and the base 52 is connected to the resistor 50. Balanced line 43 includes a DC blocking capacitor 56 connected between junction 53 and the coupling transformer 39 for blocking the direct current from the transformer 39.

Balanced line 44 includes a voltage divider network made up of a resistor 60 and the base-emitter circuit of the transistor 61. The base-emitter circuit of transistor 61 includes a base electrode 62 and an emitter electrode 63. Balanced line 44 includes a DC blocking capacitor 64 connected between terminal 49*a* and coupling transformer 39. The coupling transformer 39 includes output terminals 66 and 67 connected to a utilization circuit 70, such as a power amplifier of an audio (public address) system.

Although the base-emitter circuits of transistors 51 and 61 are used in the compressor circuit 30 of FIG. 3 other electrical devices having nonlinear conducting characteristics in which the voltage across the device is approximately a logarithmic function of the current through the device may be used. For example, a double base diode or in fact the collector-base circuits of transistors 51 and 61 may be used as shown in FIG. 5 since such devices have nonlinear conducting characteristics.

FIGS. 4 and 4*a* show the performance characteristics of the DC squelch circuit 36 and the DC control amplifier 37 as well as the operating characteristics of the compressor circuit 30. In the quiescent state, that is, when no signal is applied to input terminals 32 and 33, the DC squelch circuit 36 applies a high negative forward voltage to junctions 48 and 49 to forward bias the base-emitter circuits of transistors 51 and 61 to a low resistance state. Thus, any voltage appearing on balance lines 43 and 44, due to background noise for example, is shunted directly to ground through the base-emitter circuits of transistors 51 and 61. The coupling transformer 39 in the quiescent state, therefore, has no output at terminals 66 and 67. In the energized state, the compressor circuit 30 may receive alternating input signal voltages $E_{in}$ of various levels, for reasons which have been stated previously. Even when a very weak signal is applied to input terminals 32 and 33 the DC squelch circuit 36 is not operative since the weak signal is still above the given voltage level. The DC control amplifier 37, however, applied a negative DC voltage which is directly proportional to the weak input signal voltage $E_{in}$. The DC control voltage from the control amplifier 37 is applied to junctions 48 and 49. Since the negative DC control voltage from the control amplifier 37 is weak, the base emitter circuits of transistors 51 and 61 are forward biased by a negative voltage having a very low value so that the dynamic resistance of transistors 51 and 61 remains at relatively high value. Thus, the weak input signal voltage $E_{in}$ is not shunted to ground but is applied to coupling transformer 39 and to output terminals 66 and 67 which supply the utilization circuit 70. Substantially no direct current is drained by the base-emitter circuits of transistors 61 and 51 due to their relatively high impedance state. DC blocking capacitors 56 and 64 block any of the DC component of the signal voltage appearing at junctions 49*a* and 53.

Now let it be assumed that a very strong input signal voltage is applied across terminals 32 and 33. The DC squelch circuit 36 is turned off so that no voltage is applied across junctions 48 and 49. However, DC control amplifier 37, in response to the strong input signal voltage $E_{in}$, produces a very high negative DC control voltage which forward biases the base-emitter circuits of transistors 51 and 61. In the forward biased condition, the base-emitter circuits of transistors 51 and 61 are highly conductive and offer a very low resistance between junctions 48 and 49 and ground. The magnitude of input voltage which just causes the control amplifier 37 to become effective is indicated as S in FIG. 4*a*.

The input signal voltage $E_{in}$ is rectified and amplified by the DC control amplifier 37 in an amount directly proportional to the input signal voltage such that the dynamic resistance of the base-emitter circuits of transistors 51 and 61 is varied in an inverse amount to produce a substantially constant level output signal voltage through transformed 39. Thus, the dynamic resistance in the voltage divider networks in the balanced lines 43 and 44 is varied in an amount inversely proportional to the input signal voltage $E_{in}$.

Transistors 51 and 61 are used in the compressor circuit 30 of FIG. 3 because their base-emitter circuits have a voltage-current operating characteristic which substantially approaches the V-I characteristic of an ideal diode. FIG. 2 shows the V-I characteristic of the base-emitter circuit for various forward or negative voltages applied at junctions 48 and 49. It has been found in the operation of the compressor circuit shown in FIG. 3 that a 2N1303 transistor is suitable. Although the base-emitter circuits of transistors 51 and 61 are shown in the compressor circiut of FIG. 3 a nonlinear conducting device, a diode, other unilaterally conducting device may be used as illustrated in the compressor circuit 10 of FIG. 1.

Variations and modifications of the herein described circuits within the scope of the invention will, undoubtedly, become apparent to those skilled in the art. Thus, the foregoing description should be taken as illustrative and not in a limiting sense.

What is claimed is:

1. In a compressor circuit, for adjusting the level of an input signal voltage, the combination comprising (a) a voltage divider including a resistor and a nonlinear conducting device connected in series between an input terminal and a reference potential at a junction therebetween, (b) control means connected between said input terminal and said device bypassing said resistor for biasing said nonlinear conducting device with a direct current biasing voltage which varies in accordance with said input signal voltage, (c) said nonlinear conducting device having a variable dynamic resistance which varies in response to said direct current biasing voltage, and (d) output means including a capacitor connected to said junction conducting and alternating current voltage on said junction to a utilization circuit.

2. The invention as defined in claim 1 wherein said nonlinear conducting device is a unilateral conducting device.

3. The invention as defined in claim 2 wherein said unilateral conducting device is a diode.

4. In a compressor circuit, for adjusting the level of an input signal voltage, the combination comprising (a) a voltage divider including a resistor and a unilateral conducting device connected in series between an input terminal and a reference potential at a junction therebetween, (b) control means connected between said input terminal and said device bypassing said resistor for forward biasing said device in accordance with said input signal voltage with a direct current forward biasing voltage, (c) said unilateral conducting device having a variable dynamic resistance which varies substantially inversely with said forward biasing voltage, and (d) output terminal means connected to said junction for deriving an output signal voltage at said junction in response to an input signal.

5. The invention as defined in claim 4 wherein said unilateral conducting means is a diode.

6. The invention as defined in claim 4 wherein said unilateral conducting means is the base-emitter circuit of a transistor.

7. The invention as defined in claim 4 wherein said unilateral conducting means is the collector-base circuit of a transistor.

8. In a compressor circuit the combination comprising (a) input means for applying alternating current input signal voltages thereto, (b) voltage divider means connected between said input means and a point of reference potential, (c) said voltage divider means including a resistance and a unilateral conducting means connected in series between said resistance and said reference potential point, (d) a D.C. control amplifier having an output terminal connected to said input means and an output terminal connected to a junction between said resistance and said unilateral conducting means for deriving from said input signal voltage a direct current forward biasing voltage which is directly proportional to said input signal voltage, (e) said unilateral conducting means having a variable dynamic resistance which varies substantially inversely with said forward biasing voltage so that said dynamic resistance decreases as said forward biasing voltage increases, and (f) utilization means connected to said junction for coupling out any input signal voltage remaining at said junction.

9. In a compressor circuit for deriving a substantially consant level output signal voltage in response to an input signal voltage which varies between different levels, the combination comprising (a) input means for applying said input signal voltage to said compressor circuit, (b) a resistance connected at one end to said input means, (c) a unilateral conducting means connected between the other end of said resistance and a point of reference potential, (d) squelch circuit means connected to said input means for forward biasing said unilateral conducting means only when an input signal voltage below a given level is applied to said input means, (e) control voltage generating means connected between said input means and said other end of said resistance for deriving a direct current forward biasing voltage which varies in substantially direct proportion to said input signal voltage, (f) said unilateral conducting means having a dynamic resistance which varies substantially inversely with said direct current forward biasing voltage such that said unilateral conducting means provides a variable resistance between said resistance and said reference potential, (g) said unilateral conducting means being fully conducting in response to a given level of said direct current forward biasing voltage, and (h) output means connected between said other end of said resistance and said unilateral conducting means.

References Cited

UNITED STATES PATENTS 3,117,287 1/1964 Damico ............ 330—29

ROY LAKE, *Primary Examiner.*

E. FOLSOM, *Assistant Examiner.*